United States Patent
Roberts et al.

(10) Patent No.: US 12,395,504 B2
(45) Date of Patent: Aug. 19, 2025

(54) CLASSIFICATION USING NEIGHBORHOOD RESIDENT ANALYSIS

(71) Applicant: Sophos Limited, Abingdon (GB)

(72) Inventors: Guy William Roberts, Milton Keynes (GB); Sean McDonald, Milsons Point (AU)

(73) Assignee: Sophos Limited (GB)

( * ) Notice: Subject to any disclaimer, the term of this patent is extended or adjusted under 35 U.S.C. 154(b) by 153 days.

(21) Appl. No.: 18/471,552

(22) Filed: Sep. 21, 2023

(65) Prior Publication Data

US 2025/0106224 A1 Mar. 27, 2025

(51) Int. Cl.
*H04L 9/40* (2022.01)

(52) U.S. Cl.
CPC ...... *H04L 63/1416* (2013.01); *H04L 63/1425* (2013.01)

(58) Field of Classification Search
CPC .......... H04L 63/1416; H04L 63/1425
See application file for complete search history.

(56) References Cited

U.S. PATENT DOCUMENTS

| | | | | |
|---|---|---|---|---|
| 7,950,058 | B1* | 5/2011 | Rockwood | H04L 63/1416 726/23 |
| 9,912,688 | B1* | 3/2018 | Shaw | H04M 3/436 |
| 11,916,767 | B1* | 2/2024 | Wu | H04L 43/04 |
| 12,047,408 | B1* | 7/2024 | Colon | H04L 63/20 |
| 2013/0305369 | A1* | 11/2013 | Karta | H04L 63/1416 726/23 |
| 2015/0135316 | A1* | 5/2015 | Tock | G06F 21/566 726/23 |
| 2018/0004803 | A1* | 1/2018 | Hao | G16H 70/20 |
| 2018/0351980 | A1* | 12/2018 | Galula | H04W 12/12 |
| 2022/0156372 | A1* | 5/2022 | Harang | G06F 21/56 |
| 2022/0253526 | A1* | 8/2022 | Sanders | G06N 3/08 |
| 2023/0114821 | A1* | 4/2023 | Thomas | H04L 63/1433 726/23 |
| 2024/0236127 | A1* | 7/2024 | Dong | H04L 63/1425 |

FOREIGN PATENT DOCUMENTS

| EP | 3343868 A1 * | 7/2018 | ............. H04L 41/06 |
|---|---|---|---|
| KR | 20240066042 A * | 5/2024 | |

* cited by examiner

*Primary Examiner* — Kostas J Katsikis
(74) *Attorney, Agent, or Firm* — Schmeiser, Olsen & Watts LLP; Victor J. Baranowski, Esq.

(57) ABSTRACT

A computer system implemented method for detecting false positive events includes detecting an event that is potentially indicative of a digital threat, defining a neighborhood of a plurality of computer systems in operable communication with the computer system, inquiring to the neighborhood of the plurality of computer systems whether at least one computer system of the plurality of computer systems has had the event, or a related event, occur, receiving responses from one or more of the computer systems of the plurality of computer systems of the neighborhood based on the inquiring, analyzing the received responses from one or more of the computer systems of the plurality of computer systems of the neighborhood to determine a context of the event, classifying the event as a false positive event based on the analyzing and the determined context, and suppressing the event based on the classifying.

21 Claims, 9 Drawing Sheets

CLASSIFICATION USING NEIGHBORHOOD RESIDENT ANALYSIS

FIELD

The present disclosure relates generally to event classification in the cyber security space. More specifically, this application relates to detecting and classifying events using neighborhood resident analysis, with a particular focus on classifying false positive events.

BACKGROUND

False positive (FP) events in the cyber security industry are security alerts which are incorrectly categorized as a threat when there is, in fact, no threat. False positive classifications increase the burden on digital security resources and teams. When a false positive is acted upon, it becomes a waste of resources. Alternatively, when many false positives are being reported by a security system, it is possible for alert fatigue to cause reduced detection of actual threats. False positive events are therefore a problem that in the cyber security industry.

As such, systems and methods for classifying events in order to better detect and suppress false positive classifications, would be well received in the art.

SUMMARY

According to embodiments described herein, a method, and associated computer system and computer program product for redirecting data packets is provided. According to the method, one or more processors of a computer system detect an event that is potentially indicative of a digital threat, defining a neighborhood of a plurality of computer systems in operable communication with the computer system, and inquire to the neighborhood of the plurality of computer systems whether at least one computer system of the plurality of computer systems has had the event or a related event occur. The one or more processors of the computer system receive responses from one or more of the computer systems of the plurality of computer systems of the neighborhood based on the inquiring. The one or more processors of the computer system analyze the received responses from one or more of the computer systems of the plurality of computer systems of the neighborhood to determine a context of the event, classify the event as a false positive event based on the analyzing and the determined context, and suppress the event based on the classifying the event as the false positive event.

BRIEF DESCRIPTION OF THE DRAWINGS

The above and further advantages of this disclosure may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the disclosure.

DETAILED DESCRIPTION

Figure 1:
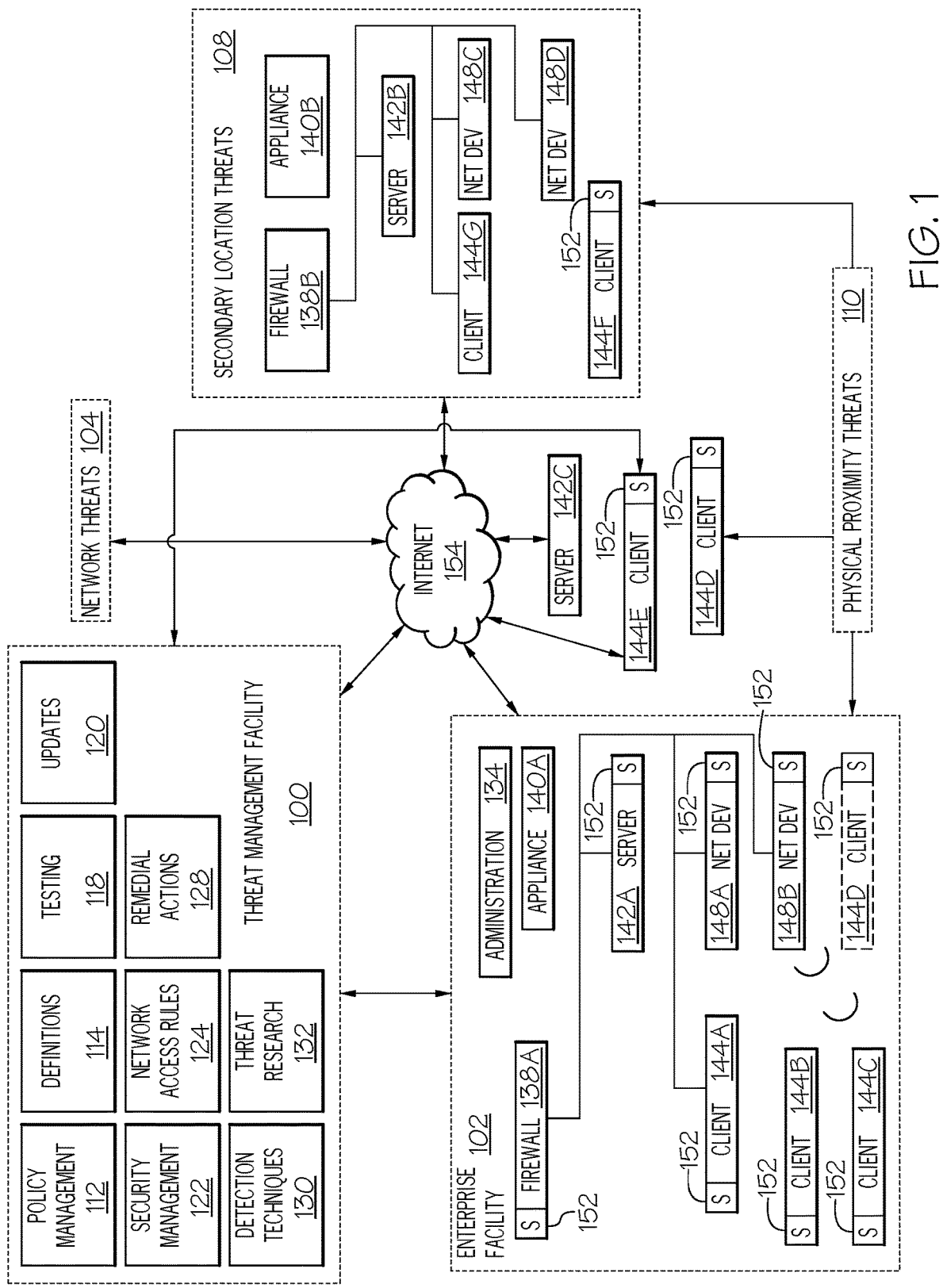
FIG. 1 depicts a block diagram of an environment for threat management, according to an example embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

Embodiments herein are directed to methods and computer systems configured to detect false positive events in the cyber security context. As contemplated herein, computers, and their central management system, upon detecting an event may request additional information from other external services, such as cloud-based classification servers or other neighboring computer systems, in order to classify the event. This information received from such external services may then be propagated to all managed computers.

The present disclosure contemplates decentralizing decision making associated with false positive detection by having each computer of a given computer system ask other reachable computers (i.e., neighbors) for information on a particular event. The present disclosure recognizes that different computer systems that can reach each other (e.g., within the same local network, enterprise system or the like) often have similar setups, similar user behaviors, and with similar actions purposefully and routinely carried out. As such, where a particular computer or computer system detects an event, such as a potential malicious operation, the computer or computer system may ask whether other computer systems resident in its neighborhood have detected a similar event, under what circumstances, and when. Having collected and exchanged such information from or with neighboring computers or computer system, the given computer system may add that new context to other known information to decide the outcome of whether an event is real or a false positive. This information and/or decision can be decided by the given computer system and/or via a group decision with neighbors—i.e., all neighbors agreeing to use the same outcome.

Methods contemplated herein can be implemented for false positive suppression. In a major false positive event, because computer systems on the same network (i.e., neighbors) often have very similar setups, a false positive on one computer will likely impact the others. Methods herein provide for each computer on the network requested to be told about the event. For example, if a file was the subject of an event was recently updated or recently installed on a computer or in a neighborhood of computers, this factor may point against a genuine attack detection. Further, the same detection on all neighbors having the same software product update or install would dramatically increase the impact of the false positive. In light of this information sharing based on events, each computer may decide individually, and/or agree as a group to suppress the decision pending further confirmation from an administrator.

Methods described herein relate to a security product which detects existing software (e.g., enterprise software, personal software or the like) installed on computers within a neighborhood. This security product may also monitor and detect when this existing software is updated and/or newly installed. Methods described herein include determining a false positive as a result of a security product releasing an update (e.g., publishes a data and/or product update) on computers with the security product installed in a neighborhood. In another embodiment, methods described include determining a false positive as a result of a detected non-security product software on the system being updated and/or installed in the neighborhood.

The computers share these events and related information with neighbours so each can determine the likeliness of a false positive. Additionally, or alternatively, the computers can share events and related information to a central security monitoring system. Information may relate to the software associated with the event (software name, files and paths), where the software involved in the event was installed from, events that have triggered the detection (file and/or network based), and temporal information (when an update or software installation or false positive event occurred, or when security product itself last updated), or the like.

The computers can also share determinations to a central threat management facility or system, where an administrator can confirm or otherwise take action. The central threat facility or system can share the outcome with a security product vendor for potential use in other neighborhoods. Thus, embodiments described herein may be deployed by a central threat management facility or system which can facilitate in deploying, monitoring and/or assisting a customer or other network of computers in threat detection, and further may facilitate in detecting and suppressing false positives in accordance to methods described herein.

FIG. 1 illustrates an environment for threat management, according to an example embodiment. Specifically, FIG. 1 depicts a block diagram of a threat management facility 100 providing protection to one or more enterprises, networks, locations, users, businesses, etc. against a variety of threats-a context in which the techniques described herein may usefully be deployed. The threat management facility 100 may represent any the threat management system, such as the threat management systems described herein below.

The threat management facility 100 may be used to protect devices and assets (e.g., IoT devices or other devices) from computer-generated and human-generated threats. For example, a corporation, school, web site, homeowner, network administrator, or other entity may institute and enforce one or more policies that control or prevents certain network users (e.g., employees, residents, users, guests, etc.) from accessing certain types of applications, devices, resources generally or in a particular manner. Policies may be created, deployed and managed, for example, through the threat management facility 100, which may update and monitor network devices, users, and assets accordingly.

The threat of enumeration attacks, malware or other compromises may be present at various points within a network 102 such as laptops, desktops, servers, gateways, communication ports, handheld or mobile devices, IoT devices, firewalls. In addition to controlling or stopping malicious code, a threat management facility 100 may provide policy management to control devices, applications, or users that might otherwise undermine productivity and network performance within the network 102.

The threat management facility 100 may provide protection to network 102 from computer-based malware, including viruses, spyware, adware, Trojans, intrusion, spam, policy abuse, advanced persistent threats, uncontrolled access, and the like. In general, the network 102 may be any networked computer-based infrastructure or the like managed by a threat management facility 100, such as an organization, association, institution, or the like, or a cloud-based facility that is available for subscription by individuals. For example, the network 102 may be a corporate, commercial, educational, governmental, or other network 102, and may include multiple networks, computing resources, and other facilities, may be distributed among more than one geographical location, and may include administration 134, a firewall 138A, an appliance 140A, a server 142A, network devices 148A-B, clients 144A-D, such as IoT devices or other devices. It will be understood that any reference herein to a client or client facilities may include the clients 144A-D shown in FIG. 1 and vice versa.

The threat management facility 100 may include computers, software, or other computing facilities supporting a plurality of functions, such as security management facility 122, policy management facility 112, update facility 120, a definitions facility 114, network access rules facility 124, remedial action facility 128, detection techniques facility 130, testing facility 118, a threat research facility 132, and the like. In embodiments, the threat protection provided by the threat management facility 100 may extend beyond the network boundaries of the network 102 to include clients 144D (or client facilities) that have moved into network connectivity not directly associated with or controlled by the network 102. Threats to client facilities may come from a variety of sources, such as from network threats 104, physical proximity threats 110, secondary location threats 108, and the like. Clients 144A-D may be protected from threats even when the client 144A-D is not directly connected or in association with the network 102, such as when a client 144E-F moves in and out of the network 102, for example when interfacing with an unprotected server 142C through the Internet 154, when a client 144F is moving into a secondary location threat 108 network such as interfacing with components 140B, 142B, 148C, 148D that are not protected, and the like.

The threat management facility 100 may use or may be included in an integrated system approach to provide network 102 protection from a plurality of threats to device resources in a plurality of locations and network configurations. The threat management facility 100 may also or instead be deployed as a stand-alone solution. For example, some or all of the threat management facility 100 components may be integrated into a server or servers at a remote location, for example in a cloud computing facility. For example, some or all of the threat management facility 100 components may be integrated into a firewall, gateway, or access point within or at the border of the network 102. In some embodiments, the threat management facility 100 may be integrated into a product, such as a third-party product, e.g., through an application programming interface, which may be deployed on endpoints, on remote servers, on internal servers or gateways for a network, or some combination of these.

The security management facility 122 may include a plurality of elements that provide protection from malware to network 102 device resources in a variety of ways including endpoint security and control, email security and control, web security and control, reputation-based filtering, control of unauthorized users, control of guest and non-compliant computers, and the like. The security management facility 122 may include a local software application that provides protection to one or more network 10 devices. The security management facility 122 may have the ability to scan client facility files for malicious code, remove or quarantine certain applications and files, prevent certain actions, perform remedial actions and perform other security measures. This may include scanning some or all of the files stored on the client facility or accessed by the client facility on a periodic basis, scanning an application when the application is executed, scanning data (e.g., files or other communication) in transit to or from a device, etc. The scanning of applications and files may be performed to detect known or unknown malicious code or unwanted applications.

The security management facility 122 may provide email security and control. The security management facility 122 may also or instead provide for web security and control, such as by helping to detect or block viruses, spyware, malware, unwanted applications, and the like, or by helping to control web browsing activity originating from client devices. In an embodiment, the security management facility 122 may provide for network access control, which may provide control over network connections. In addition, network access control may control access to virtual private networks (VPN) that provide communications networks tunneled through other networks. The security management facility 122 may provide host intrusion prevention through behavioral based protection, which may guard against known or unknown threats by analyzing behavior before or while code executes. The security management facility 122 may provide reputation filtering, which may target or identify sources of code.

In general, the security management facility 122 may support overall security of the network 102 using the various techniques described above, optionally as supplemented by updates of malicious code information and so forth for distribution across the network 102.

The administration facility 134 may provide control over the security management facility 122 when updates are performed. Information from the security management facility 122 may also be sent from the enterprise back to a third party, a vendor, or the like, which may lead to improved performance of the threat management facility 100.

The threat management facility 100 may include a policy management facility 112 configured to take actions, such as to block applications, users, communications, devices, and so on based on determinations made. The policy management facility 112 may employ a set of rules or policies that determine network 102 access permissions for a client 144. In an embodiment, a policy database may include a block list, a blacklist, an allowed list, a whitelist, or the like, or combinations of the foregoing, that may provide a list of resources internal or external to the network 102 that may or may not be accessed by client devices 144. The policy management facility 112 may also or instead include rule-based filtering of access requests or resource requests, or other suitable techniques for controlling access to resources consistent with a corresponding policy.

The policy management facility 112 may also provide configuration policies to be used to compare and control the configuration of applications, operating systems, hardware, devices, network associated with the network 102. An evolving threat environment may dictate timely updates, and thus an update management facility 120 may also be provided by the threat management facility 100. In addition, a policy management facility 112 may require update management (e.g., as provided by the update facility 120 herein described). In embodiments, the update management facility 120 may provide for patch management or other software updating, version control, and so forth.

The security facility 122 and policy management facility 112 may push information to the network 102 and/or a given client 144. The network 102 and/or client 144 may also or instead request information from the security facility 122 and/or policy management facility 112, network server facilities 142, or there may be a combination of pushing and pulling of information. In an embodiment, the policy management facility 112 and the security facility 122 management update modules may work in concert to provide information to the network 102 and/or client 144 facility for control of applications, devices, users, and so on.

As threats are identified and characterized, the threat management facility 100 may create updates that may be used to allow the threat management facility 100 to detect and remediate malicious software, unwanted applications, configuration and policy changes, and the like. The threat definition facility 114 may contain threat identification updates, also referred to as definition files. A definition file may be a virus identity file that may include definitions of known or potential malicious code. The virus identity definition files may provide information that may identify malicious code within files, applications, or the like. The definition files may be accessed by security management facility 122 when scanning files or applications within the client facility for the determination of malicious code that may be within the file or application. A definition management facility may include a definition for a neural network or other recognition engine. A definition management facility 114 may provide timely updates of definition files information to the network, client facilities, and the like.

The security management facility 122 may be used to scan an outgoing file and verify that the outgoing file is permitted to be transmitted per the enterprise facility 102 rules and policies. By checking outgoing files, the security management facility 122 may be able to discover malicious code infected files that were not detected as incoming files.

The threat management facility 100 may provide controlled access to the network 102. A network access rules facility 124 may be responsible for determining if a client facility 144 application should be granted access to a requested network resource. In an embodiment, the network access rules facility 124 may verify access rights for client facilities 144 to or from the network 102 or may verify access rights of computer facilities to or from external networks. When network access for a client facility is denied, the network access rules facility 124 may send an information file to the client facility, e.g., a command or command file that the remedial action facility 128 may access and take action upon. The network access rules facility 124 may include one or more databases that may include a block list, a blacklist, an allowed list, a white list, a reputation list, an unacceptable network resource database, an acceptable network resource database, a network resource reputation database, or the like. The network access rules facility 124 may incorporate rule evaluation. Rule evaluation may, for example, parse network access requests and apply the parsed information to network access rules. The network access rule facility 124 may also or instead provide updated rules and policies to the enterprise facility 102.

When a threat or policy violation is detected by the threat management facility 100, the threat management facility 100 may perform or initiate remedial action through a remedial action facility 128. Remedial action may take a variety of forms, such as terminating or modifying an ongoing process or interaction, issuing an alert, sending a warning to a client or administration facility 134 of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on the client facility 144, quarantining a related application (or files, processes or the like), terminating the application or device, isolating the application or device, moving a process or application code to a sandbox for evaluation, isolating the client facility 144 to a location or status within the network that restricts network access, blocking a network access port from a client facility 144, reporting the application to an administration facility 134, or the like, as well as any combination of the foregoing.

Remedial action may be provided as a result of a detection of a threat or violation. The detection techniques facility 130 may include tools for monitoring the network or managed devices within the network 102. The detection techniques facility 130 may provide functions such as monitoring activity and stored files on computing facilities. Detection techniques, such as scanning a computer's stored files, may provide the capability of checking files for stored threats, either in the active or passive state. Detection techniques such as streaming file management may be used to check files received at the network, a gateway facility, a client facility, and the like.

Verifying that the threat management facility 100 detects threats and violations to established policy, may require the ability to test the system, either at the system level or for a particular computing component. The testing facility 118 may allow the administration facility 134 to coordinate the testing of the security configurations of client facility computing facilities on a network. For example, the administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility 144 based on the reported information. Remedial action may be taken for any of the client facilities 144 as determined by the administration facility 134.

The threat management facility 100 may provide threat protection across the network 102 to devices such as clients 144, a server facility 142, an administration facility 134, a firewall 138, a gateway, one or more network devices (e.g., hubs and routers 148, a threat management or other appliance 140, any number of desktop or mobile users, and the like. As used herein the term endpoint may refer to any compute instance running on a device that can source data, receive data, evaluate data, buffer data, process data or the like (such as a user's desktop computer, laptop, IoT device, server, etc.). This may, for example, include any client devices as well as other network devices and the like within the network 102, such as a firewall or gateway (as a data evaluation endpoint computer system), a laptop (as a mobile endpoint computer), a tablet (as a hand-held endpoint computer), a mobile phone, or the like. The term endpoint may also or instead refer to any final or intermediate source or destination for data within a network 102. The endpoint computer security facility 152 may be an application locally loaded onto any corresponding computer platform or computer support component, either for local security functions or for management by the threat management facility 100 or other remote resource, or any combination of these.

The network 102 may include a plurality of client facility computing platforms on which the endpoint computer security facility 152 is installed. A client facility computing platform may be a computer system that is able to access a service on another computer, such as a server facility 142, via a network. The endpoint computer security facility 152 may, in corresponding fashion, provide security in any suitable context such as among a plurality of networked applications, for a client facility connecting to an application server facility 142, for a web browser client facility connecting to a web server facility 142, for an e-mail client facility retrieving e-mail from an Internet 154 service provider's mail storage servers 142 or web site, and the like, as well as any variations or combinations of the foregoing.

The network 102 may include one or more of a variety of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be any device(s), application program(s), operating system(s), or combination of the foregoing that accepts client facility connections in order to service requests from clients 144. In embodiments, the threat management facility 100 may provide threat protection to server facilities 142 within the network 102 as load conditions and application changes are made.

A server facility 142 may include an appliance facility 140, where the appliance facility 140 provides specific services to other devices on the network. Simple server facility 142 appliances may also be utilized across the network 102 infrastructure, such as switches, routers, hubs, gateways, print servers, modems, and the like. These appliances may provide interconnection services within the network 102, and therefore may advance the spread of a threat if not properly protected.

A client facility 144 may be protected from threats from within the network 102 using a local or personal firewall, which may be a hardware firewall, software firewall, or combination, that controls network traffic to and from a client. The local firewall may permit or deny communications based on a security policy. Another component that may be protected by an endpoint computer security facility 152 is a network firewall facility 138, which may include hardware or software, in a standalone device or integrated with another network component, that may be configured to permit, deny, or proxy data through a network 102.

The interface between the threat management facility 100 and the network 102, and through the appliance facility 140 to embedded endpoint computer security facilities, may include a set of tools that may be the same or different for various implementations, and may allow each network administrator to implement custom controls. In embodiments, these controls may include both automatic actions and managed actions. The administration facility 134 may configure policy rules that determine interactions. The administration facility 134 may also establish license management, which in turn may further determine interactions associated with licensed applications. In embodiments, interactions between the threat management facility 100 and the network 102 may provide threat protection to the network 102 by managing the flow of network data into and out of the network 102 through automatic actions that may be configured by the threat management facility 100 for example by action or configuration of the administration facility 134.

Client facilities 144 within the network 102 may be connected to the network 102 by way of wired network facilities 148A or wireless network facilities 148B. Mobile wireless facility clients 144, because of their ability to connect to a wireless network access point, may connect to the Internet 154 outside the physical boundary of the network 102, and therefore outside the threat-protected environment of the network 102. Such a client 144, if not for the presence of a locally installed endpoint computer security facility 152, may be exposed to a malware attack or perform actions counter to network 102 policies. Thus, the endpoint computer security facility 152 may provide local protection against various threats and policy violations. The threat management facility 100 may also or instead be configured to protect the out-of-enterprise facility 102 mobile client facility (e.g., the clients 144) through interactions over the Internet 154 (or other network) with the locally installed endpoint computer security facility 152. Thus, mobile client facilities that are components of the network 102 but temporarily outside connectivity with the network 102 may be provided with the threat protection and policy control the same as or similar to client facilities 144 inside the network 102. In addition, mobile client facilities 144 may receive the same interactions to and from the threat management facility 100 as client facilities 144 inside the enterprise facility 102, such as by receiving the same or equivalent services via an embedded endpoint computer security facility 152.

Interactions between the threat management facility 100 and the components of the network 102, including mobile client facility extensions of the network 102, may ultimately be connected through the Internet 154 or any other network or combination of networks. Security-related or policy-related downloads and upgrades to the network 102 may be passed from the threat management facility 100 through to components of the network 102 equipped with the endpoint computer security facility 152. In turn, the endpoint computer security facility 152 components of the enterprise facility or network 102 may upload policy and access requests back across the Internet 154 and through to the threat management facility 100. The Internet 154 however, is also the path through which threats may be transmitted from their source, and an endpoint computer security facility 152 may be configured to protect a device outside the network 102 through locally deployed protective measures and through suitable interactions with the threat management facility 100.

Thus, if the mobile client facility were to attempt to connect into an unprotected connection point, such as at a secondary location 108 that is not a part of the network 102, the mobile client facility 144 may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108, where the endpoint computer security facility 152 may dictate what applications, actions, resources, users, etc. are allowed, blocked, modified, or the like.

The secondary location 108 may have no endpoint computer security facilities 152 as a part of its components, such as its firewalls 138B, servers 142B, clients 144G, hubs and routers 148C-D, and the like. As a result, the components of the secondary location 108 may be open to threat attacks, and become potential sources of threats, as well as any mobile enterprise facility clients 144B-F that may be connected to the secondary location's 108 network. In this instance, these components may now unknowingly spread a threat to others connected to the network 102.

Some threats do not come directly from the Internet 154. For example, a physical proximity threat 110 may be deployed on a client device while that device is connected to an unprotected network connection outside the enterprise facility 102, and when the device is subsequently connected to a client 144 on the network 102, the device can deploy the malware or otherwise pose a threat. In embodiments, the endpoint computer security facility 152 may protect the network 102 against these types of physical proximity threats 110, for instance, through scanning any device prior to allowing data transfers, through security validation certificates, through establishing a safe zone within the network 102 to receive data for evaluation, and the like.

Having provided an overall context for threat detection, the description now turns to a brief discussion of embodiments of the present concept, followed by a description of systems and methods for detecting false positive events.

Figure 2:
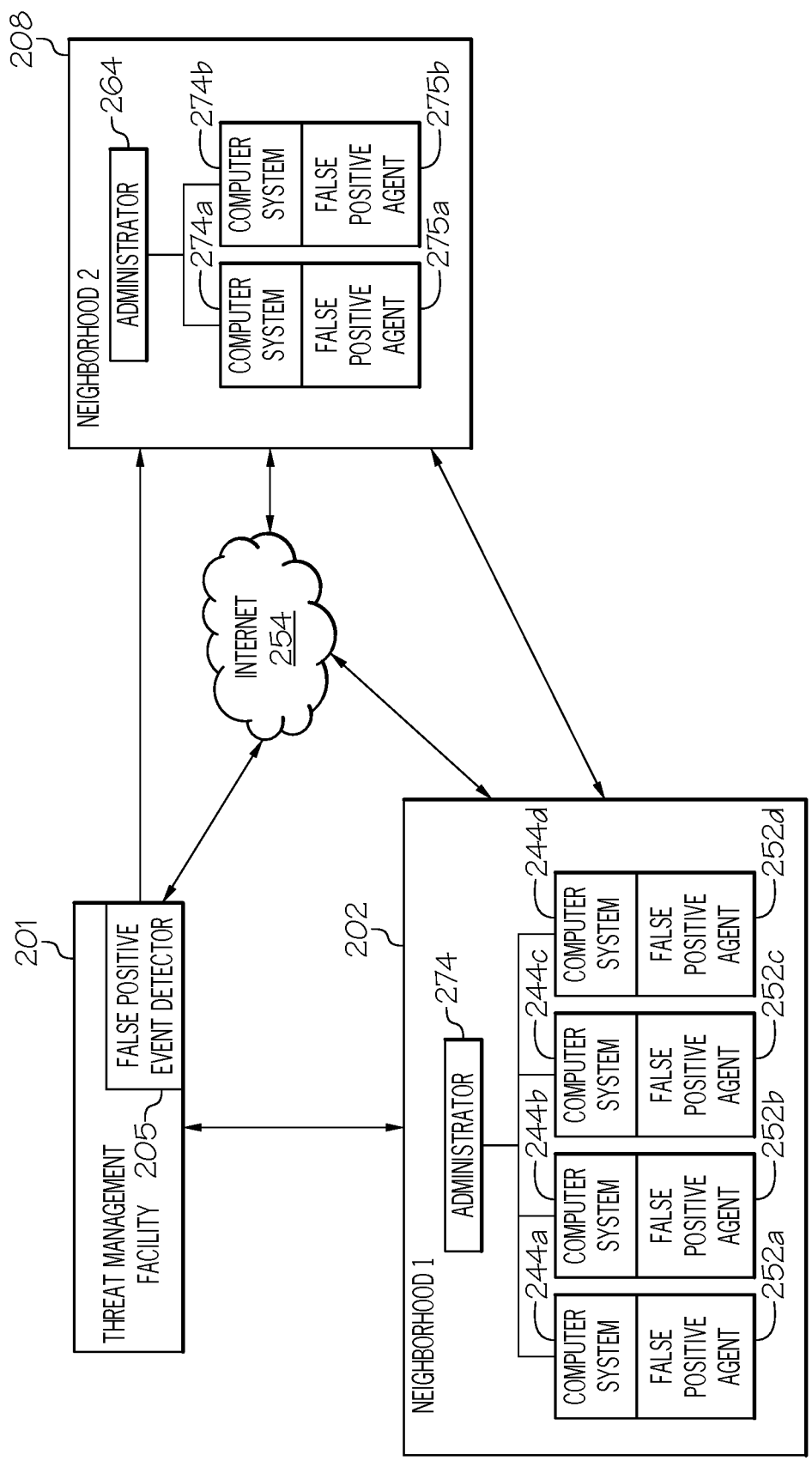
FIG. 2 depicts an architectural representation of a computer system, according to an example embodiment.

FIG. 2 depicts an architectural representation of a computer system 200, according to an example embodiment. The computer system 200 includes a threat management facility 201, which may be the same or similar to the threat management facility 100 shown in FIG. 1. In addition to the various facilities described hereinabove, the threat management facility 201 includes a false positive event detector system 205. The false positive event detector system 205 may be deployed by the threat management facility 201 and include the computer system or systems which perform the functionality of the methods described herein.

The threat management facility 201 and/or the false positive event detector system 205 thereof may be in communication with a first neighborhood 202 of computers and a second neighborhood 208 of computers. As defined herein, a "neighborhood" may be defined as any group of devices that are in communication which have one or more shared commonalities such as a common network (local area, wide area, personal area network, wireless network, campus area network, or the like), a common customer or entity owning or controlling the group of devices, a common physical location, a common operating system, one or more common installed software applications, and/or a common security software installed and/or monitoring. In its most common form, a neighborhood may represent one customer or customer center being monitored by a central threat management facility. A neighborhood of devices may include any communicative devices, including computers, laptops, tablets, mobile phones, digital watches, Internet of Things devices, or the like.

As shown, the first neighborhood 202 includes a plurality of such devices, including an administrator system 234 and computer systems 244a, 244b, 244c, 244d. Similarly, the second neighborhood includes a plurality of devices, including an administrator 264 and computer systems 274a, 274b. While each of the neighborhoods 202, 208 shares one administrator, respectively in the embodiment shown, any number of administrator systems are contemplated. Further, the administrator systems 234, 264 may each include any number of computers or computer systems acting to control, monitor or otherwise maintain devices within the respective neighborhoods 202, 208. The administrator systems 234 may include security monitoring software, such as the that which is described herein.

The computer systems 244a, 244b, 244c, 244d, 274a, 274b are each shown including a false positive agent systems 252a, 252b, 252c, 252d, 275a, 275b, respectively. The false positive agent systems 252a, 252b, 252c, 252d, 275a, 275b may be in communication with the respective administrator systems 234, 264 and may be configured to share information associated with events, and potential false positive events, as described herein below. The various computer systems 252a, 252b, 252c, 252d, 275a, 275b may each further be in communication with each other and/or may be in direct communication with the threat management facility 201 and/or the false positive event detector 205 thereof.

In one embodiment, it is contemplated that each of the first neighborhood 202 and the second neighborhood 208 may be separate customers of the threat management facility 201. In such an embodiment, the neighborhoods 202, 208 may not be in direct communication. In other embodiments, the neighborhoods 202, 208 may each be respective subdivided portions of a single enterprise or customer of the threat management facility, and may thereby share a larger network scheme and communicate directly through this larger network. For example, the first neighborhoods 202 may be a first physical location of a particular customer or enterprise, and the second neighborhood 208 maybe a second physical location of a particular customer or enterprise. In other embodiments, the functionality of the threat management facility is done exclusively by the administrator(s) 234, 264, where no central system is needed. In still other embodiments, the concepts described herein may be applied to a single neighborhood deploying the false positive systems described herein. In still other embodiments, any number of neighborhoods may be provided with any number of communication schemes. Thus, the scope of the disclosure is not limited to the representation shown in FIG. 2. Whatever the embodiment, the neighborhoods 202, 208, the threat management facility 201 and/or the computer devices thereof may be connected to the internet 254, as shown.

Figure 3:
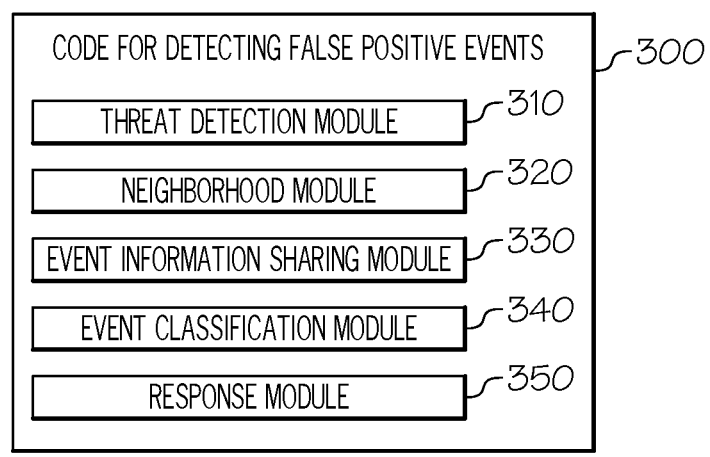
FIG. 3 depicts a diagram of modules included in computer code contained in computer systems of FIGS. 1 and 2, according to an example embodiment.

FIG. 3 depicts a diagram of modules included in computer code contained in computer systems of FIGS. 1 and 2, according to an example embodiment. In particular, the computer code may be contained within a threat management facility and/or an agent security software application installed on a customer or enterprise device. The code for detecting false positive security events 300 includes a threat detection module 310, a neighborhood module 320, an event information sharing module 330, an event classification module 340, and a response module 350. The number of modules can vary, and some modules may be combined with other modules or separated into two or more modules in various combinations. The functionality of the modules included in code for detecting false positive events 300 is discussed in detail with respect to the methodology shown in FIGS. 4-8, which is presented below.

Figure 4:
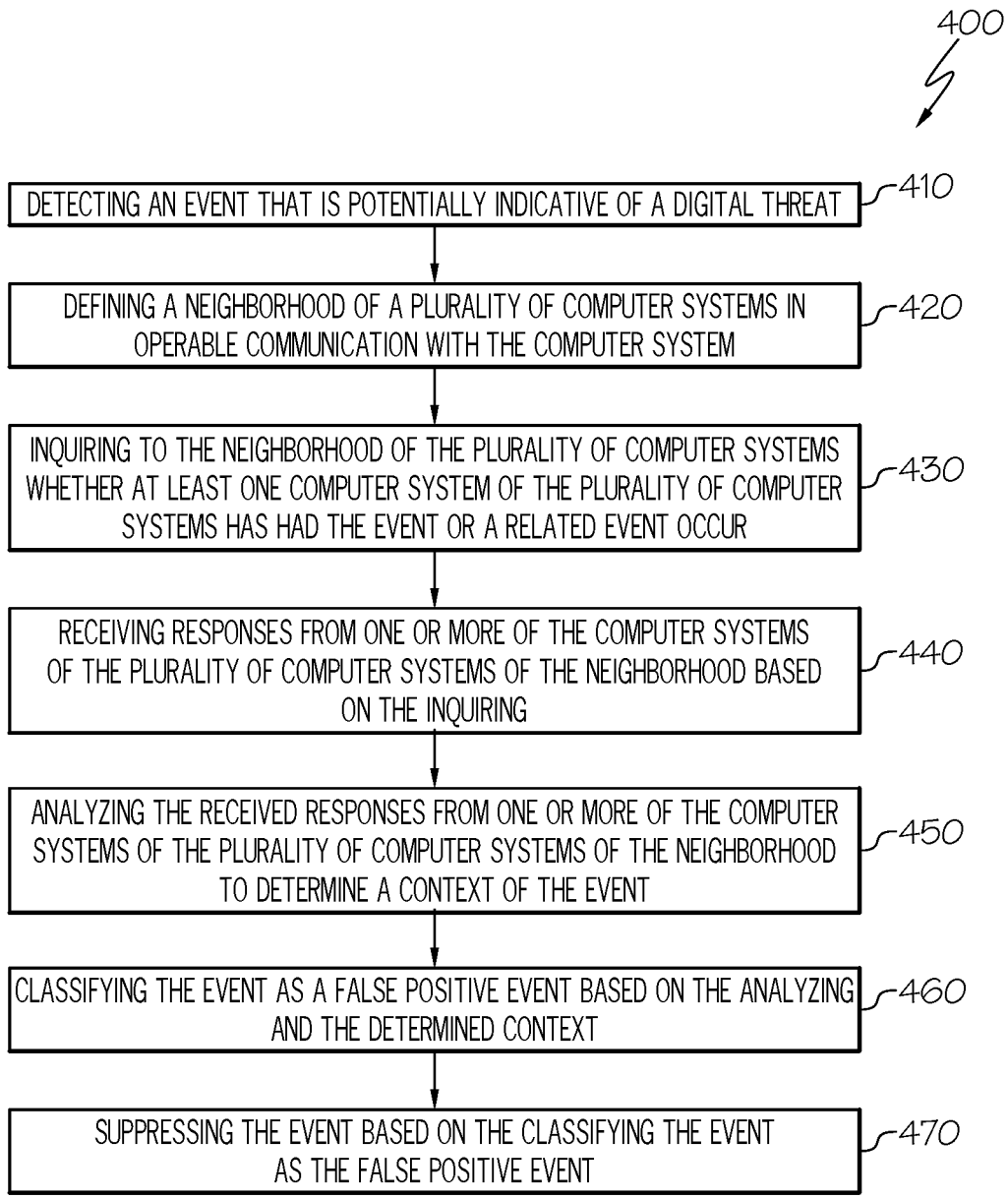
FIG. 4 depicts a method of suppressing an event based on a false positive classification, according to an example embodiment.

FIG. 4 depicts a method 400 of suppressing an event based on a false positive classification, according to an example embodiment. The method 400 may be performable by either or both of a threat management system 100, 201, or by a computer system that is a part of enterprise facility 102 or a neighborhood 202, 208. The method 400 may be performable by execution of code for detecting false positive security events, such as the module code structure shown in FIG. 3.

The method 400 includes a step 410 of detecting an event that is potentially indicative of a digital threat. The first step 410 may be conducted by any of a threat management facility, such as the threat management facility 100, 201, a system administrator 234, 264, or a false positive agent, such as one of the false positive agents 252a, 252b, 252c, 252d, 264a, 264b operating on a neighborhood device, such as one of the computer systems 244a, 244b, 244c, 244d, 274a, 274b. In particular, the step 410 may be performable by the threat detection module 310 described herein above. The step 410 may further include carrying out threat monitoring in the manner generally described herein above, and detecting potential threats accordingly.

The method 400 includes a further step 420 of defining a neighborhood of a plurality of computer systems, such as at least one of the first or second neighborhoods 202, 208 described hereinabove. The neighborhood of computer systems may be in operable communication with a computer system carrying out the method 400. As described above, the neighborhood may be, for example, any group of devices that are in communication which have one or more shared commonalities such as a common network (local area, wide area, personal area network, wireless network, campus area network, or the like), a common customer or entity owning or controlling the group of devices, a common physical location, a common operating system, one or more common installed software applications, and/or a common security software installed and/or monitoring. The step 420 of defining of the neighborhood may be conducted by an administrator or central management system, such as a threat management facility. Further, the step 420 may be conducted by the code of the neighborhood module 320 described herein above. The neighborhood module may include the capability of defining neighborhoods in any appropriate manner, and storing neighborhood definition information, as well as neighborhood classification information for devices within the neighborhood.

The method 400 includes a step 430 of inquiring to the neighborhood of the plurality of computer systems whether at least one computer system of the plurality of computer systems has had the event or a related event occur. For example if the event is detected as occurring in or at the computer system 244a (shown in FIG. 2), the step 430 may include inquiring with the other computer systems 244b, 244c, 244d within the neighborhood 202 as to whether an event or related event has occurred. Hereinafter, a "related event" could mean an event sharing the same event type, one or more shared circumstances, or the like. The method 400 then includes a step 440 of receiving responses from one or more of the computer systems of the plurality of computer systems of the neighborhood based on the inquiring. The steps 430, 440 may each be conducted by the event information sharing module 330 of the code shown in FIG. 3.

The method 400 includes as step 450 of analyzing the received responses from one or more of the computer systems of the plurality of computer systems of the neighborhood to determine a context of the event. The step 450 may be conducted by the event classification module 340, described herein above. Various example sub-methods related to this step 450 are described herein below and shown in FIGS. 5-7. In particular, the step 450 may include determining whether security product releases occurred or whether a common software application was recently installed or updated on the various computer systems 244a, 244b, 244c, 244d in the system. Again, the step 450 may occur within one or more of the various computer systems 244a, 244b, 244c, 244d and/or at the administer level within the neighborhood, or at the central level of a threat management facility.

The method 400 includes a step 460 of classifying the event as a false positive event based on the analyzing and the determined context. The step 460 may be conducted by the event classification module 340, described herein above. Various analyses may be used in determining whether an event is a false positive based on information gathered across a neighborhood of computers. For example, if a security product releases a security product update on a computer system within a predetermined time period of when the event is detected on the computer system, and this same event (or a related event) is also found on other computer systems in the neighborhood which also installed the security product update within a predetermined time period from when the event (or the related event) was detected on the other computer systems, this may trigger a determination that an event is a false positive event. In another example, if a software application was recently installed on a computer system within a predetermined time period of when the event is detected on the computer system, and this same event (or a related event) is also found on other computer systems in the neighborhood which also installed the same application within a predetermined time period from when the event (or the related event) was detected on the other computer systems, this may trigger a determination that an event is a false positive event. In still another example, if a software application was recently updated on a computer system within a predetermined time period of when the event is detected on the computer system, and this same event (or a related event) is also found on other computer systems in the neighborhood which also installed the same application update within a predetermined time period from when the event (or the related event) was detected on the other computer systems, this may trigger a determination that an event is a false positive event.

The method 400 includes a step 470 of suppressing the event based on the classifying the event as the false positive event. The step 470 may be conducted by the response module 350, described herein above. The step 470 may include systems and methods for mitigating the impact of the event within a security system context, such as by ensuring that the event does not trigger a security system response, for example. For example, suppression may include turning off an event alert associated with the event in a security software product. While not shown, the step 470 may additionally or alternatively include other responses conducted by the response module 350, such as alerting the result of the classifying the event as the false positive event to an administrator of the computer system, such as one of the administrator systems 234, 264 or an administrator of a central threat management facility. Still further, the step 470 may additionally or alternatively include notifying the neighborhood of the plurality of computer systems of the suppressing of the event as a result of the classifying the event as the false positive event. This may help inform the entirety of the neighborhood of a false positive event.

Figure 5:
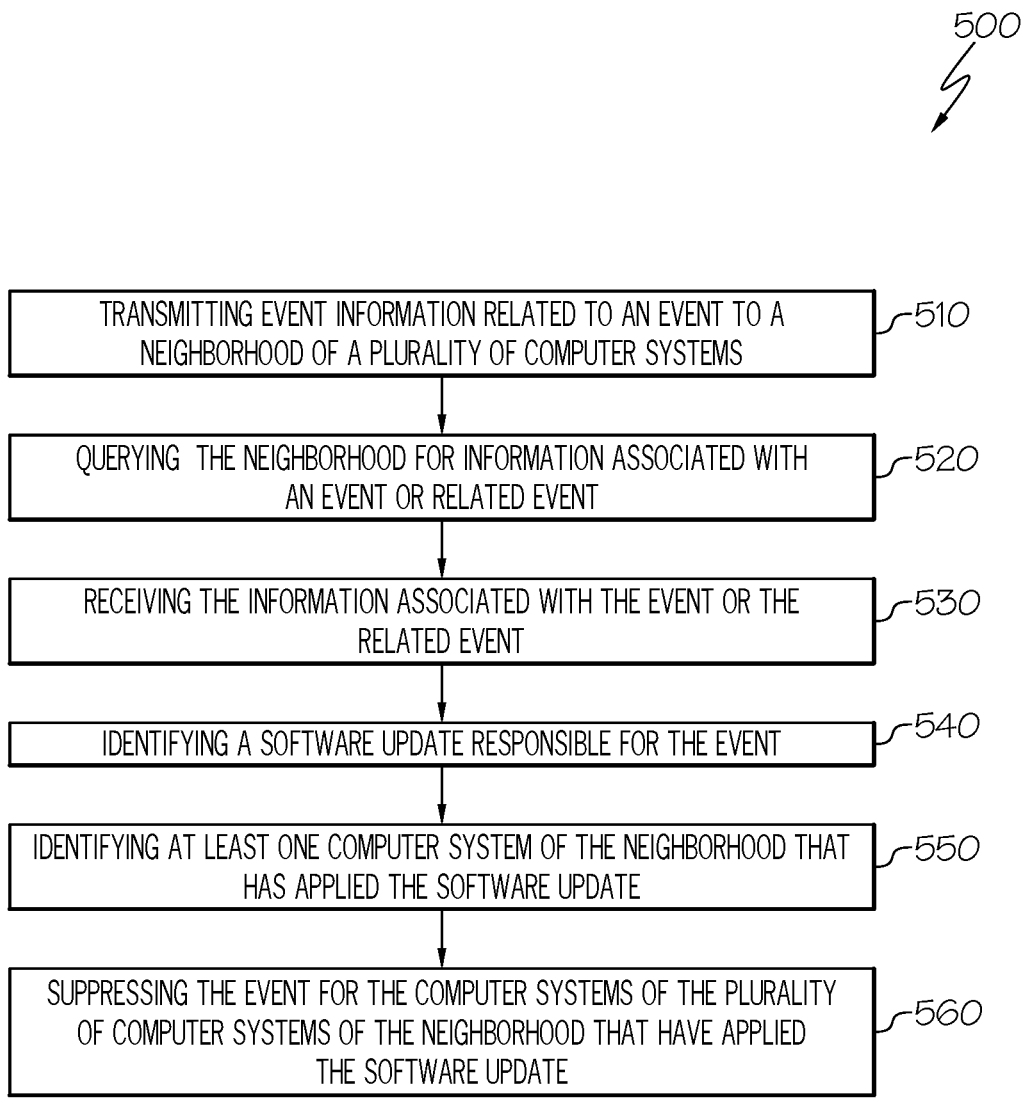
FIG. 5 depicts a method of sharing outcomes related to an event caused by a software update, according to an example embodiment.

FIG. 5 depicts a method 500 of sharing outcomes related to an event caused by a software update, according to an example embodiment. The method 500 contemplates a process whereby computers within a neighborhood share event related information, such as software potential false positives, software names associated with an event, software files associated with the event, software paths associated with the event, where a software update was installed, when an event was detected in relation to a software update, or the like. This information can then be shared among neighborhood computers to find if commonality exists. If it is determined that a software update was responsible for an event (rather than a malicious attack or enumeration threat, for example), based on the sharing of this information between the computers within a neighborhood, the present methods contemplate suppressing the event within all computer systems within a neighborhood.

The method 500 may be performable by either or both of a threat management system 100, 201, or by a computer system that is a part of enterprise facility 102 or a neighborhood 202, 208. The method 500 may be performable by execution of code for detecting false positive security events, such as the module code structure shown in FIG. 3.

The method 500 of sharing outcomes related to an event caused by a software update includes a first step 510 of transmitting event information related to an event to a neighborhood of a plurality of computer systems. This event information may be related to an event flagged as a security threat by a security product operating locally at a computer in the neighborhood (such as one or more of the false positive agents 252a, 252b, 252c, 252d, 275a, 275b). With such an event detected, the step 510 contemplates sharing this information with the other neighborhood computers. This sharing by be by and between security program agent software systems running locally on the neighborhood computers, for example.

The method 500 includes a step 520 of querying the neighborhood for information associated with an event or related event. With the event shared by the initiating computer of the process in step 510, information is then shared by the various other computers within the neighborhood associated with that event (or a related event), should the event or a related event be occurring on other computers. The method 500 then includes a step 530 of receiving the information associated with the event or the related event. The steps 510, 520, 530 may be conducted, for example, by the event information sharing module 330 described above.

The method 500 includes a step 540 of identifying a software update responsible for the event. The step 540 may be accomplished by automatically reviewing when events are flagged as potential security threats. Next, the step 540 may include analyzing whether a one or more events (e.g. a predefined number of events) flagged in such a way across a plurality of computers within a neighborhood of computers occurred within a predetermined time from when a software update was installed on a computer system associated with (or reporting) the event. For example, the analysis may hinge on at least two definable variables: the number of reported events in proximity to a software update, and how close the event was to the software update. Other factors may include a more detailed analysis of software files and paths associated with an update, locations a software update was installed from, the type or category of event which triggered the detection, and the like. This analysis may be conducted by the event classification module 340 of the code for detecting false positive events 300 described above.

The method 500 includes a step 550 of identifying at least one computer system of the neighborhood that has applied the software update. This identification may be based on information received through the querying. Finally, the method 500 includes a step 560 of suppressing the event for the computer systems of the plurality of computer systems of the neighborhood that have applied the software update.

Figure 6:
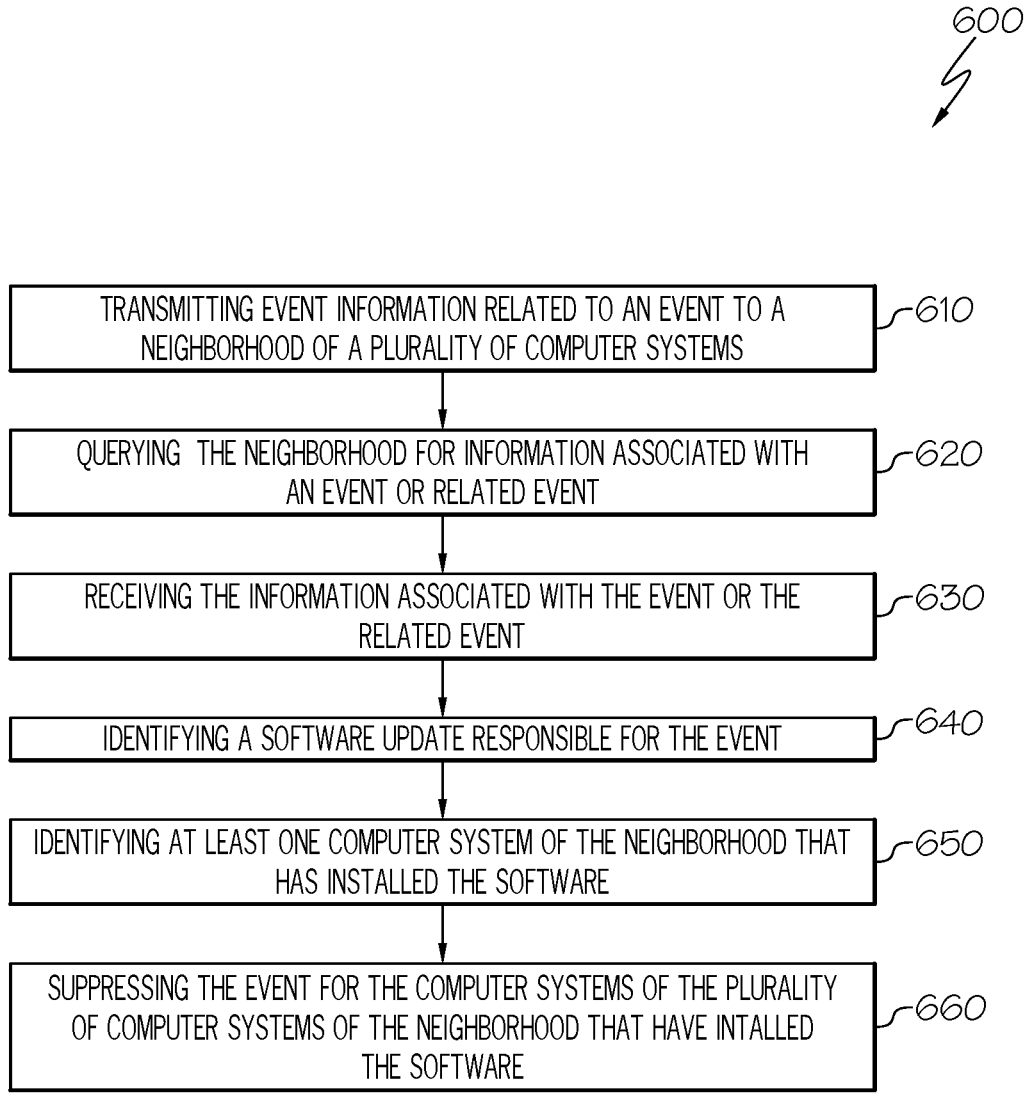
FIG. 6 depicts a method of sharing outcomes related to an event caused by a new software installation, according to an example embodiment.

FIG. 6 depicts a method 600 of sharing outcomes related to an event caused by a new software installation, according to an example embodiment. The method 600 contemplates a process whereby computers within a neighborhood share event related information, such as software potential false positives, software names associated with an event, software files associated with the event, software paths associated with the event, where a software application was installed, when an event was detected in relation to a software new software installation, or the like. This information can then be shared among neighborhood computers to find if commonality exists. If it is determined that a new software installation was responsible for an event (rather than a malicious attack or enumeration threat, for example), based on the sharing of this information between the computers within a neighborhood, the present methods contemplate suppressing the event within all computer systems within a neighborhood.

The method 600 may be performable by either or both of a threat management system 100, 201, or by a computer system that is a part of enterprise facility 102 or a neighborhood 202, 208. The method 600 may be performable by execution of code for detecting false positive security events, such as the module code structure shown in FIG. 3.

The method 600 of sharing outcomes related to an event caused by a new software installation includes a first step 610 of transmitting event information related to an event to a neighborhood of a plurality of computer systems. This event information may be related to an event flagged as a security threat by a security product operating locally at a computer in the neighborhood (such as one or more of the false positive agents 252a, 252b, 252c, 252d. 275a, 275b). With such an event detected, the step 610 contemplates sharing this information with the other neighborhood computers. This sharing by be by and between security program agent software systems running locally on the neighborhood computers, for example.

The method 600 includes a step 620 of querying the neighborhood for information associated with an event or related event. With the event shared by the initiating computer of the process in step 610, information is then shared by the various other computers within the neighborhood associated with that event (or a related event), should the event or a related event be occurring on other computers. The method 600 then includes a step 630 of receiving the information associated with the event or the related event. The steps 610, 620, 630 may be conducted, for example, by the event information sharing module 330 described above.

The method 600 includes a step 640 of identifying a software installation responsible for the event. The step 640 may be accomplished by automatically reviewing when events are flagged as potential security threats. Next, the step 640 may include analyzing whether a one or more events (e.g. a predefined number of events) flagged in such a way across a plurality of computers within a neighborhood of computers occurred within a predetermined time from when a new software application was installed on a computer system associated with (or reporting) the event. For example, the analysis may hinge on at least two definable variables: the number of reported events in proximity to a new software application installation, and how close the event was to the new software application installation. Other factors may include a more detailed analysis of software files being installed, paths associated with an installation, locations a software application was installed from, the type or category of event which triggered the detection, and the like. This analysis may be conducted by the event classification module 340 of the code for detecting false positive events 300 described above.

The method 600 includes a step 650 of identifying at least one computer system of the neighborhood that has installed the software. This identification may be based on information received through the querying. Finally, the method 600 includes a step 660 of suppressing the event for the computer systems of the plurality of computer systems of the neighborhood that have installed the software.

Figure 7:
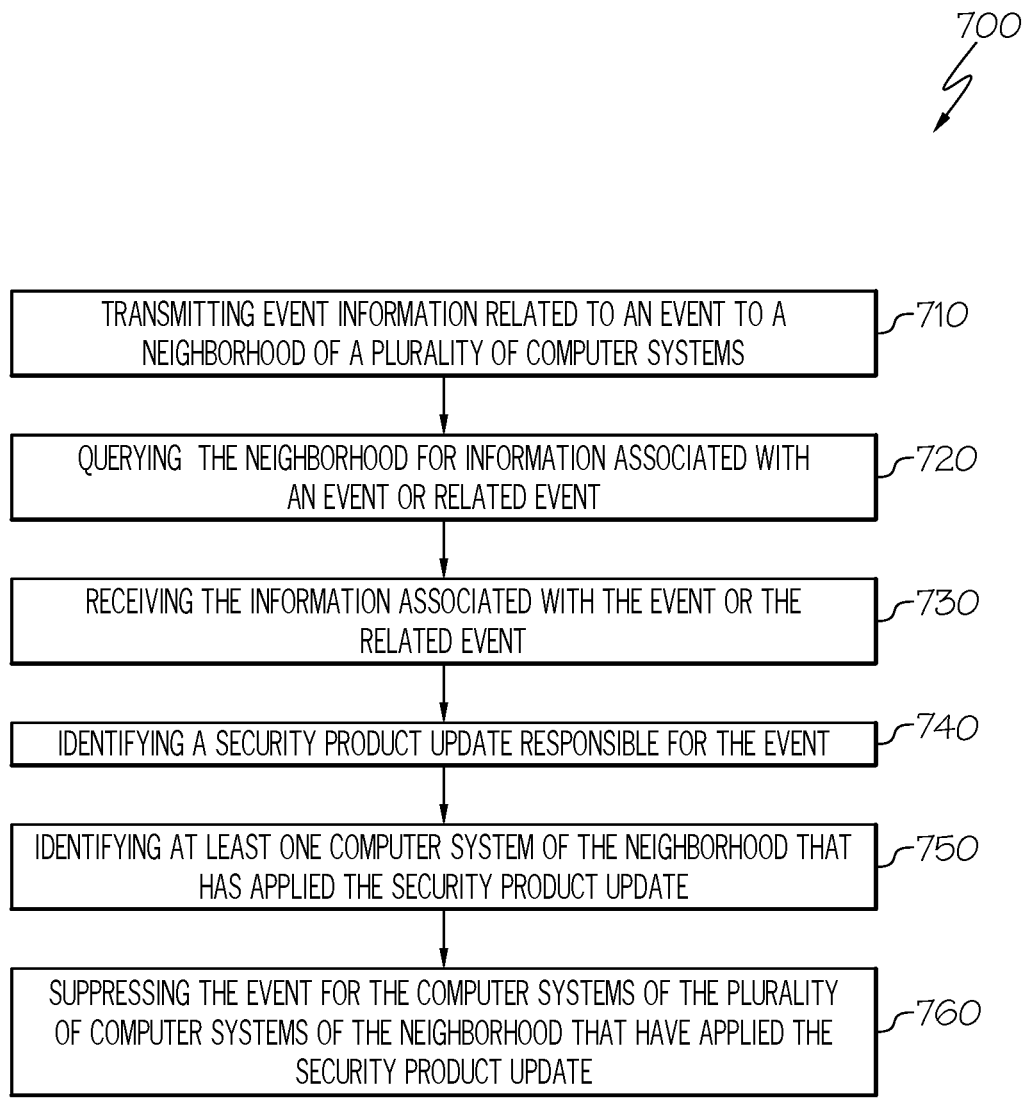
FIG. 7 depicts a method of sharing outcomes related to an event caused by a security product update, according to an example embodiment.

FIG. 7 depicts a method 700 of sharing outcomes related to an event caused by a security product update, according to an example embodiment. The method 700 contemplates a process whereby computers within a neighborhood share event related information, such as software potential false positives, security product or software names associated with an event, security product files associated with the event, security product paths associated with the event, where a security product update was installed, when an event was detected in relation to a security product update, or the like. This information can then be shared among neighborhood computers to find if commonality exists. If it is determined that a security product update was responsible for an event (rather than a malicious attack or enumeration threat, for example), based on the sharing of this information between the computers within a neighborhood, the present methods contemplate suppressing the event within all computer systems within a neighborhood.

The method 700 may be performable by either or both of a threat management system 100, 201, or by a computer system that is a part of enterprise facility 102 or a neighborhood 202, 208. The method 700 may be performable by execution of code for detecting false positive security events, such as the module code structure shown in FIG. 3.

The method 700 of sharing outcomes related to an event caused by a security product update includes a first step 710 of transmitting event information related to an event to a neighborhood of a plurality of computer systems. This event information may be related to an event flagged as a security threat by a security product operating locally at a computer in the neighborhood (such as one or more of the false positive agents 252*a*, 252*b*, 252*c*, 252*d*, 275*a*, 275*b*). With such an event detected, the step 710 contemplates sharing this information with the other neighborhood computers. This sharing by be by and between security program agent software systems running locally on the neighborhood computers, for example.

The method 700 includes a step 720 of querying the neighborhood for information associated with an event or related event. With the event shared by the initiating computer of the process in step 710, information is then shared by the various other computers within the neighborhood associated with that event (or a related event), should the event or a related event be occurring on other computers. The method 700 then includes a step 730 of receiving the information associated with the event or the related event. The steps 710, 720, 730 may be conducted, for example, by the event information sharing module 330 described above.

The method 700 includes a step 740 of identifying a security product update responsible for the event. The step 740 may be accomplished by automatically reviewing when events are flagged as potential security threats. Next, the step 740 may include analyzing whether a one or more events (e.g. a predefined number of events) flagged in such a way across a plurality of computers within a neighborhood of computers occurred within a predetermined time from when a security product update occurred on a computer system associated with (or reporting) the event. For example, the analysis may hinge on at least two definable variables: the number of reported events in proximity to a security product update for a security product, and how close the event was to the security product update. Other factors may include a more detailed analysis of software files being installed in the security product update, paths associated with an installation or patch of the security product update, locations the security product update was installed from, the type or category of event which triggered the detection, and the like. This analysis may be conducted by the event classification module 340 of the code for detecting false positive events 300 described above.

The method 700 includes a step 750 of identifying at least one computer system of the neighborhood that has applied the security product update. This identification may be based on information received through the querying. Finally, the method 700 includes a step 760 of suppressing the event for the computer systems of the plurality of computer systems of the neighborhood that have applied the security product update.

Figure 8:
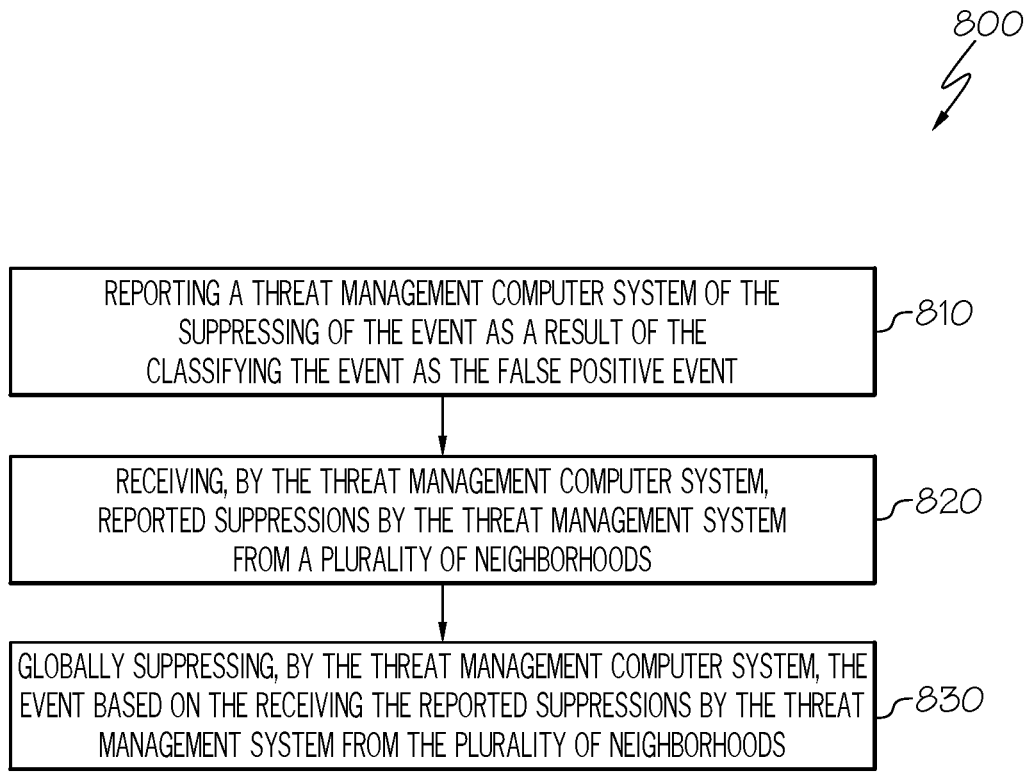
FIG. 8 depicts a method of globally suppressing a false positive event, according to an example embodiment.

FIG. 8 depicts a method 800 of globally suppressing a false positive event, according to an example embodiment. The method 800 may occur when a neighborhood computer system shares the outcome of a false positive and event suppression with a central security products management service, such as a centralized threat management facility overseeing multiple neighborhoods, networks, customers, accounts and/or enterprises. The method 800 contemplates aggregating information associated with detected events globally across the multiple neighborhoods, networks, customers, accounts and/or enterprises so that a suppression occurring in one neighborhood can be applied to another neighborhood, in the event that the same or a related false positive event occurs. It is contemplated that such a method may require customer optionality and consent, as information may be used for other customers of the centralized threat management facility and/or client of the security product thereof. In the event that the centralized threat management facility is not the security product vendor associated with the event, the centralized threat management facility may share the results of the false positive within the global neighborhood with the security product vendor, who may confirm or otherwise take action on the false positive event to prevent further false positive events occurring in the future.

The method 800 may be performable by either or both of a threat management system 100, 201, or by a computer system that is a part of enterprise facility 102 or a neighborhood 202, 208. The method 800 may be performable by execution of code for detecting false positive security events, such as the module code structure shown in FIG. 3.

The method 800 includes a first step 810 of reporting a threat management computer system of the suppressing of an event as a result of the classifying the event as a false positive event. The step 810 may occur, for example, in the case that the previous methodologies are performed locally within a neighborhood by an administrator, for example. The step 810 contemplates in such closed system that a suppression associated with an event which has occurred is then reported to a global management computer system, such as the threat management facility 100, 201 described above. The method 800 may also include providing the information associated with the event in making the suppression decision that was gathered from the computers in the neighborhood. While the method 800 contemplates a neighborhood localized determination of the false positive event and resulting suppression, it is also possible that the global threat management facility is provided with information associated with events well prior to this and is involved in the false positive analysis.

The method 800 includes a next step 820 of receiving, by the threat management computer system, reported suppressions by the threat management system from a plurality of neighborhoods. In this example, the global threat management computer system receives information associated with events, or related events, which have been suppressed, and can determine from this that a global step should be taken, such as globally suppressing events associated with a given event (or related event), contacting a security product vendor, or the like.

The method 800 includes a next step 830 of globally suppressing, by the threat management computer system, the event based on the receiving the reported suppressions by the threat management system from the plurality of neighborhoods. This global suppression may be completed directly by the global threat management facility or may occur via the global threat management facility providing notifications or alerts to the various neighborhood administrators in a global system that a particular event has been found to be a false positive.

Figure 9:
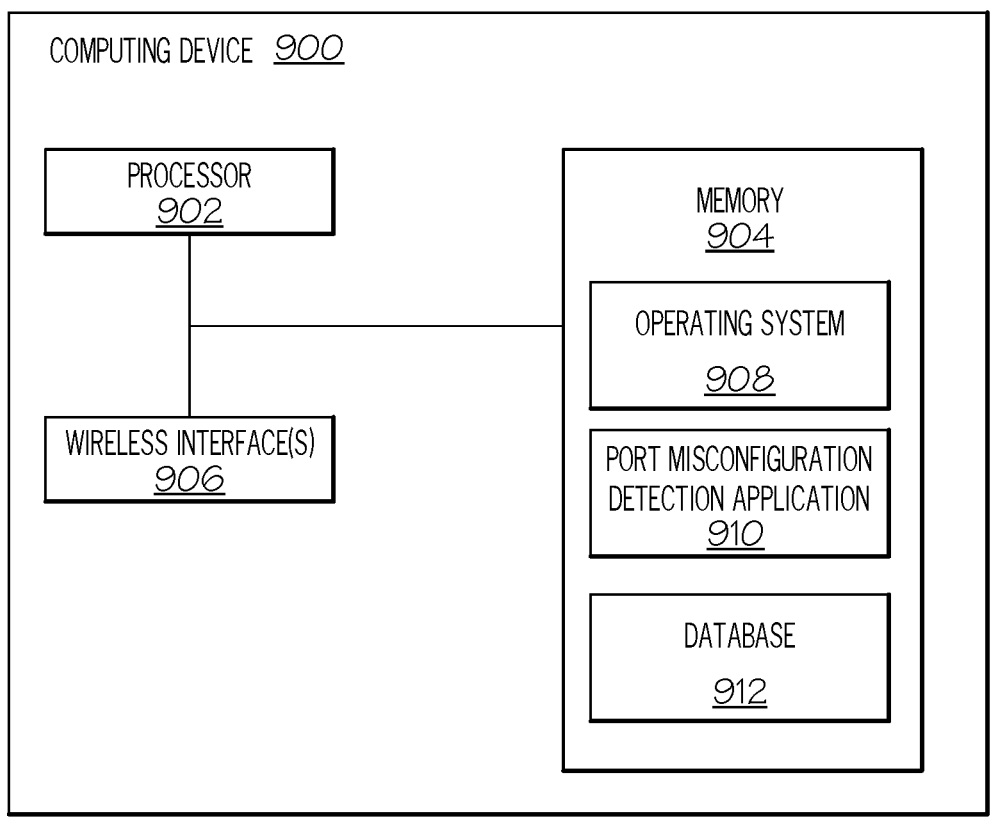
FIG. 9 depicts a diagram of an example computing device, according to an example embodiment.

FIG. 9 is a diagram of an example computing device 900, according to an example embodiment. As shown, the computing device 900 includes one or more processors 902, non-transitory computer readable medium or memory 904, I/O interface devices 906 (e.g., wireless communications, etc.) and a network interface 908. The computer readable medium 904 may include an operating system 908, a malicious enumeration attack detection application 710 for detecting malicious enumeration attacks using flow data in accordance with the systems and methods described herein.

In operation, the processor 902 may execute the application 910 stored in the computer readable medium 904. The application 910 may include software instructions that, when executed by the processor, cause the processor to perform operations for detecting a false positive event, as described and shown in FIGS. 2-8, with particular reference to the steps of the methodology shown in FIGS. 4-8.

The application program 910 may operate in conjunction with the data section 912 and the operating system 908. The device 900 may communicate with other devices (e.g., a wireless access point) via the I/O interfaces 906.

Accordingly, the foregoing systems and methods present technologically beneficial approach to addressing the problem of determining whether a notification or alert is an actual notification or alert, or if the alert or notification is a false positive. Being able to detect false positives is beneficial because computer systems, and information technology or cybersecurity systems, are burdened by the expending of vast resources when a false positive event occurs that goes undetected. The disclosed systems and methods represent a technological advantage over prior implementations and approaches because the present system increases the likeliness of detecting a false positive event in an automated and intelligent manner through the sharing of information across various systems, and the automatic acting on this shared information. In this way, the foregoing systems and methods represent an advancement in the cybersecurity industry.

Although the foregoing Figures illustrate various embodiments of the disclosed systems and methods, additional and/or alternative embodiments are contemplated as falling within the scope of this disclosure. For example, in one embodiment, this disclosure provides a method that includes detecting, by one or more processors of a computer system, an event that is potentially indicative of a digital threat, defining, by the one or more processors of the computer system, a neighborhood of a plurality of computer systems in operable communication with the computer system, inquiring, by the one or more processors of the computer system, to the neighborhood of the plurality of computer systems whether at least one computer system of the plurality of computer systems has had the event or a related event occur, receiving, by the one or more processors of the computer system, responses from one or more of the computer systems of the plurality of computer systems of the neighborhood based on the inquiring, analyzing, by the one or more processors of the computer system, the received responses from one or more of the computer systems of the plurality of computer systems of the neighborhood to determine a context of the event, classifying, by the one or more processors of the computer system, the event as a false positive event based on the analyzing and the determined context, and suppressing, by the one or more processors of the computer system, the event based on the classifying the event as the false positive event.

In another embodiment the method includes querying, by the one or more processors of the computer system, the neighborhood of the at least one computer system of the plurality of computer systems for information associated with the event or the related event that has occurred at the at least one computer system of the plurality of computer systems of the neighborhood, and receiving, by the one or more processors of the computer system, the information associated with the event or the related event that has occurred at the at least one computer system of the computer systems of the plurality of computer systems of the neighborhood. The analyzing the responses from the at least one computer system of the computer systems of the plurality of computer systems of the neighborhood to the inquiring further includes analyzing the received information.

In a further embodiment of the method, the information relates to information selected from the group consisting of a type of software associated with the event, a software update associated with a type of software associated with the event, temporal information associated with the event, and address information associated with the event, and combinations thereof.

In yet another embodiment, the method includes identifying, by the one or more processors of the computer system, a software update responsible for the event, identifying, by the one or more processors of the computer system, the at least one computer system of the computer systems of the plurality of computer systems of the neighborhood that have applied the software update, and suppressing, by the one or more processors of the computer system, the event for the at least one computer system of the computer systems of the plurality of computer systems of the neighborhood that have applied the software update.

In yet a further embodiment, the method includes transmitting, by the one or more processors of the computer system, event information related to the event to the neighborhood of the plurality of computer systems.

In another embodiment of the method, the event information transmitted includes at least one digital artifact associated with the event.

In a further embodiment, the method further includes alerting, by the one or more processors of the computer system, the result of the classifying the event as the false positive event to an administrator of the computer system.

In yet another embodiment, the method includes notifying, by the one or more processors of the computer system, the neighborhood of the plurality of computer systems of the suppressing of the event as a result of the classifying the event as the false positive event.

In yet a further embodiment of the method, the neighborhood is defined as having a commonality selected from the group consisting of a common network, a common customer, a common physical location, a common operating system, and a common installed software application.

In another embodiment, the method includes reporting, by the one or more processors of the computer system, a threat management computer system of the suppressing of the event as a result of the classifying the event as the false positive event, receiving, by the threat management computer system, reported suppressions by the threat management system from a plurality of neighborhoods, and globally suppressing, by the threat management computer system, the event based on the receiving the reported suppressions by the threat management system from the plurality of neighborhoods.

In another embodiment, the disclosure provides for a computer system that includes one or more computer processors, one or more computer readable storage media, and computer readable code stored collectively in the one or more computer readable storage media, with the computer readable code including data and instructions to cause the one or more computer processors to perform a method that includes detecting, by the one or more processors of the computer system, an event that is potentially indicative of a digital threat, defining, by the one or more processors of the computer system, a neighborhood of a plurality of computer systems in operable communication with the computer system, inquiring, by the one or more processors of the computer system, to the neighborhood of the plurality of computer systems whether at least one computer system of the plurality of computer systems has had the event or a related event occur, receiving, by the one or more processors of the computer system, responses from one or more of the computer systems of the plurality of computer systems of the neighborhood based on the inquiring, analyzing, by the one or more processors of the computer system, the received responses from one or more of the computer systems of the plurality of computer systems of the neighborhood to determine a context of the event, classifying, by the one or more processors of the computer system, the event as a false positive event based on the analyzing and the determined context, and suppressing, by the one or more processors of the computer system, the event based on the classifying the event as the false positive event.

In another embodiment of the computer system, the method includes querying, by the one or more processors of the computer system, the neighborhood of the at least one computer system of the plurality of computer systems for information associated with the event or the related event that has occurred at the at least one computer system of the plurality of computer systems of the neighborhood, and receiving, by the one or more processors of the computer system, the information associated with the event or the related event that has occurred at the at least one computer system of the computer systems of the plurality of computer systems of the neighborhood. The analyzing the responses from the at least one computer system of the computer systems of the plurality of computer systems of the neighborhood to the inquiring further includes analyzing the received information.

In another embodiment of the computer system, the method includes querying, by the one or more processors of the computer system, the neighborhood of the at least one computer system of the plurality of computer systems for information associated with the event or the related event that has occurred at the at least one computer system of the plurality of computer systems of the neighborhood, and receiving, by the one or more processors of the computer system, the information associated with the event or the related event that has occurred at the at least one computer system of the computer systems of the plurality of computer systems of the neighborhood. The analyzing the responses from the at least one computer system of the computer systems of the plurality of computer systems of the neighborhood to the inquiring further includes analyzing the received information.

In a further embodiment of the computer system, the information relates to information selected from the group consisting of a type of software associated with the event, a software update associated with a type of software associated with the event, temporal information associated with the event, and address information associated with the event, and combinations thereof.

In yet another embodiment of the computer system, the method includes identifying, by the one or more processors of the computer system, a software update responsible for the event, identifying, by the one or more processors of the computer system, the at least one computer system of the computer systems of the plurality of computer systems of the neighborhood that have applied the software update, and suppressing, by the one or more processors of the computer system, the event for the at least one computer system of the computer systems of the plurality of computer systems of the neighborhood that have applied the software update.

In yet another embodiment of the computer system, the method includes transmitting, by the one or more processors of the computer system, event information related to the event to the neighborhood of the plurality of computer systems.

In yet a further embodiment of the computer system, the event information transmitted includes at least one digital artifact associated with the event.

In another embodiment of the computer system, the method includes alerting, by the one or more processors of the computer system, the result of the classifying the event as the false positive event to an administrator of the computer system.

In a further embodiment of the computer system, notifying, by the one or more processors of the computer system, the neighborhood of the plurality of computer systems of the suppressing of the event as a result of the classifying the event as the false positive event.

In yet another embodiment of the computer system, the neighborhood is defined as having a commonality selected from the group consisting of a common network, a common customer, a common physical location, a common operating system, and a common installed software application.

In yet a further embodiment of the computer system, the method includes reporting, by the one or more processors of the computer system, a threat management computer system of the suppressing of the event as a result of the classifying the event as the false positive event, receiving, by the threat management computer system, reported suppressions by the threat management system from a plurality of neighborhoods, and globally suppressing, by the threat management computer system, the event based on the receiving the reported suppressions by the threat management system from the plurality of neighborhoods.

In another embodiment, the disclosure provides for a computer program product that includes one or more computer readable storage media having computer readable program code collectively stored on the one or more computer readable storage media, the computer readable program code being executed by one or more processors of a network detection and response computer system to cause the computer system to perform a method. The method includes detecting, by one or more processors of a computer system, an event that is potentially indicative of a digital threat, defining, by the one or more processors of the computer system, a neighborhood of a plurality of computer systems in operable communication with the computer system, inquiring, by the one or more processors of the computer system, to the neighborhood of the plurality of computer systems whether at least one computer system of the plurality of computer systems has had the event or a related event occur, receiving, by the one or more processors of the computer system, responses from one or more of the computer systems of the plurality of computer systems of the neighborhood based on the inquiring, analyzing, by the one or more processors of the computer system, the received responses from one or more of the computer systems of the plurality of computer systems of the neighborhood to determine a context of the event, classifying, by the one or more processors of the computer system, the event as a false positive event based on the analyzing and the determined context, and suppressing, by the one or more processors of the computer system, the event based on the classifying the event as the false positive event.

In another embodiment of the computer program product, the method includes querying, by the one or more processors of the computer system, the neighborhood of the at least one computer system of the plurality of computer systems for information associated with the event or the related event that has occurred at the at least one computer system of the plurality of computer systems of the neighborhood, and receiving, by the one or more processors of the computer system, the information associated with the event or the related event that has occurred at the at least one computer system of the computer systems of the plurality of computer systems of the neighborhood. The analyzing the responses from the at least one computer system of the computer systems of the plurality of computer systems of the neighborhood to the inquiring further includes analyzing the received information.

In a further embodiment of the computer program product, the information relates to information selected from the group consisting of a type of software associated with the event, a software update associated with a type of software associated with the event, temporal information associated with the event, and address information associated with the event, and combinations thereof.

In yet a further embodiment of the computer program product, the method includes identifying, by the one or more processors of the computer system, a software update responsible for the event, identifying, by the one or more processors of the computer system, the at least one computer system of the computer systems of the plurality of computer systems of the neighborhood that have applied the software update, and suppressing, by the one or more processors of the computer system, the event for the at least one computer system of the computer systems of the plurality of computer systems of the neighborhood that have applied the software update.

In another embodiment of the computer program product, the method includes transmitting, by the one or more processors of the computer system, event information related to the event to the neighborhood of the plurality of computer systems.

In a further embodiment of the computer program product, the event information transmitted includes at least one digital artifact associated with the event.

In yet another embodiment of the computer program product, the method includes alerting, by the one or more processors of the computer system, the result of the classifying the event as the false positive event to an administrator of the computer system.

In yet a further embodiment of the computer program product, notifying, by the one or more processors of the computer system, the neighborhood of the plurality of computer systems of the suppressing of the event as a result of the classifying the event as the false positive event.

In another embodiment of the computer program product, the neighborhood is defined as having a commonality selected from the group consisting of a common network, a common customer, a common physical location, a common operating system, and a common installed software application.

In yet a further embodiment of the computer program product, the method includes reporting, by the one or more processors of the computer system, a threat management computer system of the suppressing of the event as a result of the classifying the event as the false positive event, receiving, by the threat management computer system, reported suppressions by the threat management system from a plurality of neighborhoods, and globally suppressing, by the threat management computer system, the event based on the receiving the reported suppressions by the threat management system from the plurality of neighborhoods.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C#.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a non-transitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for secure VLAN in wireless networks.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The invention claimed is:

1. A method for detecting false positive events, comprising:
   detecting, by one or more processors of a computer system, an event that is potentially indicative of a digital threat;
   defining, by the one or more processors of the computer system, a neighborhood of a plurality of computer systems in operable communication with the computer system;
   inquiring, by the one or more processors of the computer system, to the neighborhood of the plurality of computer systems whether at least one computer system of the plurality of computer systems has had the event or a related event occur;
   receiving, by the one or more processors of the computer system, responses from one or more of the computer systems of the plurality of computer systems of the neighborhood based on the inquiring;
   analyzing, by the one or more processors of the computer system, the received responses from one or more of the computer systems of the plurality of computer systems of the neighborhood to determine a context of the event;
   classifying, by the one or more processors of the computer system, the event as a false positive event based on the analyzing and the determined context; and
   suppressing, by the one or more processors of the computer system, the event based on the classifying the event as the false positive event.

2. The method of claim 1, further comprising:
   querying, by the one or more processors of the computer system, the neighborhood of the at least one computer system of the plurality of computer systems for information associated with the event or the related event that has occurred at the at least one computer system of the plurality of computer systems of the neighborhood; and
   receiving, by the one or more processors of the computer system, the information associated with the event or the related event that has occurred at the at least one computer system of the computer systems of the plurality of computer systems of the neighborhood,
   wherein the analyzing the responses from the at least one computer system of the computer systems of the plurality of computer systems of the neighborhood to the inquiring further includes analyzing the received information.

3. The method of claim 2, wherein the information relates to information selected from the group consisting of a type of software associated with the event, a software update associated with a type of software associated with the event, temporal information associated with the event, and address information associated with the event, and combinations thereof.

4. The method of claim 2, further comprising:
   identifying, by the one or more processors of the computer system, a software update responsible for the event;

identifying, by the one or more processors of the computer system, the at least one computer system of the computer systems of the plurality of computer systems of the neighborhood that have applied the software update; and suppressing, by the one or more processors of the computer system, the event for the at least one computer system of the computer systems of the plurality of computer systems of the neighborhood that have applied the software update.

5. The method of claim 2, further comprising:

transmitting, by the one or more processors of the computer system, event information related to the event to the neighborhood of the plurality of computer systems.

6. The method of claim 5, wherein the event information transmitted includes at least one digital artifact associated with the event.

7. The method of claim 1, further comprising:

alerting, by the one or more processors of the computer system, the result of the classifying the event as the false positive event to an administrator of the computer system.

8. The method of claim 7, further comprising:

notifying, by the one or more processors of the computer system, the neighborhood of the plurality of computer systems of the suppressing of the event as a result of the classifying the event as the false positive event.

9. The method of claim 1, wherein the neighborhood is defined as having a commonality selected from the group consisting of a common network, a common customer, a common physical location, a common operating system, and a common installed software application.

10. The method of claim 1, further comprising:

reporting, by the one or more processors of the computer system, a threat management computer system of the suppressing of the event as a result of the classifying the event as the false positive event;

receiving, by the threat management computer system, reported suppressions by the threat management system from a plurality of neighborhoods; and globally suppressing, by the threat management computer system, the event based on the receiving the reported suppressions by the threat management system from the plurality of neighborhoods.

11. A computer system, comprising:

one or more processors;

one or more computer readable storage media; and computer readable code stored collectively in the one or more computer readable storage media, with the computer readable code including data and instructions to cause the one or more computer processors to perform a method comprising:

detecting, by the one or more processors of the computer system, an event that is potentially indicative of a digital threat;

defining, by the one or more processors of the computer system, a neighborhood of a plurality of computer systems in operable communication with the computer system;

inquiring, by the one or more processors of the computer system, to the neighborhood of the plurality of computer systems whether at least one computer system of the plurality of computer systems has had the event or a related event occur;

receiving, by the one or more processors of the computer system, responses from one or more of the computer systems of the plurality of computer systems of the neighborhood based on the inquiring;

analyzing, by the one or more processors of the computer system, the received responses from one or more of the computer systems of the plurality of computer systems of the neighborhood to determine a context of the event;

classifying, by the one or more processors of the computer system, the event as a false positive event based on the analyzing and the determined context; and suppressing, by the one or more processors of the computer system, the event based on the classifying the event as the false positive event.

12. The computer system of claim 11, the method further comprising:

querying, by the one or more processors of the computer system, the neighborhood of the at least one computer system of the plurality of computer systems for information associated with the event or the related event that has occurred at the at least one computer system of the plurality of computer systems of the neighborhood; and receiving, by the one or more processors of the computer system, the information associated with the event or the related event that has occurred at the at least one computer system of the computer systems of the plurality of computer systems of the neighborhood, wherein the analyzing the responses from the at least one computer system of the computer systems of the plurality of computer systems of the neighborhood to the inquiring further includes analyzing the received information.

13. The computer system of claim 12, wherein the information relates to information selected from the group consisting of a type of software associated with the event, a software update associated with a type of software associated with the event, temporal information associated with the event, and address information associated with the event, and combinations thereof.

14. The computer system of claim 12, the method further comprising:

identifying, by the one or more processors of the computer system, a software update responsible for the event;

identifying, by the one or more processors of the computer system, the at least one computer system of the computer systems of the plurality of computer systems of the neighborhood that have applied the software update; and suppressing, by the one or more processors of the computer system, the event for the at least one computer system of the computer systems of the plurality of computer systems of the neighborhood that have applied the software update.

15. The computer system of claim 12, the method further comprising:

transmitting, by the one or more processors of the computer system, event information related to the event to the neighborhood of the plurality of computer systems.

16. The computer system of claim 15, wherein the event information transmitted includes at least one digital artifact associated with the event.

17. The computer system of claim 11, the method further comprising:

alerting, by the one or more processors of the computer system, the result of the classifying the event as the false positive event to an administrator of the computer system.

18. The computer system of claim 17, the method further comprising:
notifying, by the one or more processors of the computer system, the neighborhood of the plurality of computer systems of the suppressing of the event as a result of the classifying the event as the false positive event.

19. The computer system of claim 11, wherein the neighborhood is defined as having a commonality selected from the group consisting of a common network, a common customer, a common physical location, a common operating system, and a common installed software application.

20. The computer system of claim 11, the method further comprising:
reporting, by the one or more processors of the computer system, a threat management computer system of the suppressing of the event as a result of the classifying the event as the false positive event;
receiving, by the threat management computer system, reported suppressions by the threat management system from a plurality of neighborhoods; and
globally suppressing, by the threat management computer system, the event based on the receiving the reported suppressions by the threat management system from the plurality of neighborhoods.

21. A computer program product comprising:
one or more non-transitory computer readable storage media having computer readable program code collectively stored on the one or more computer readable storage media, the computer readable program code being executed by one or more processors of a computer system to cause the computer system to perform a method comprising:
detecting, by the one or more processors of the computer system, an event that is potentially indicative of a digital threat;
defining, by the one or more processors of the computer system, a neighborhood of a plurality of computer systems in operable communication with the computer system;
inquiring, by the one or more processors of the computer system, to the neighborhood of the plurality of computer systems whether at least one computer system of the plurality of computer systems has had the event or a related event occur;
receiving, by the one or more processors of the computer system, responses from one or more of the computer systems of the plurality of computer systems of the neighborhood based on the inquiring;
analyzing, by the one or more processors of the computer system, the received responses from one or more of the computer systems of the plurality of computer systems of the neighborhood to determine a context of the event;
classifying, by the one or more processors of the computer system, the event as a false positive event based on the analyzing and the determined context; and
suppressing, by the one or more processors of the computer system, the event based on the classifying the event as the false positive event.

* * * * *